G. K. DAVOL.
VALVE FOR AIR COMPRESSORS AND THE LIKE.
APPLICATION FILED FEB. 2, 1916.

1,254,781.

Patented Jan. 29, 1918.
4 SHEETS—SHEET 1.

WITNESSES:
John A. Dienner
Cameron A. Whitsett

INVENTOR.
George K. Davol
BY
Brown, Hanson & Boettcher
ATTORNEYS.

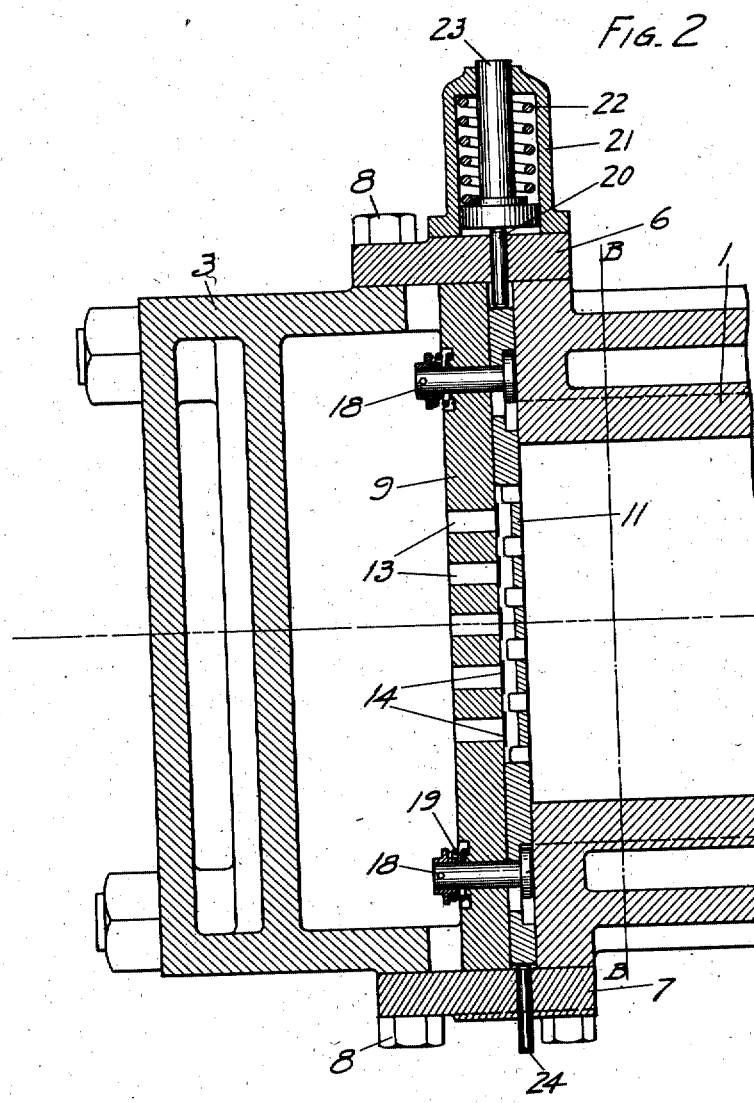

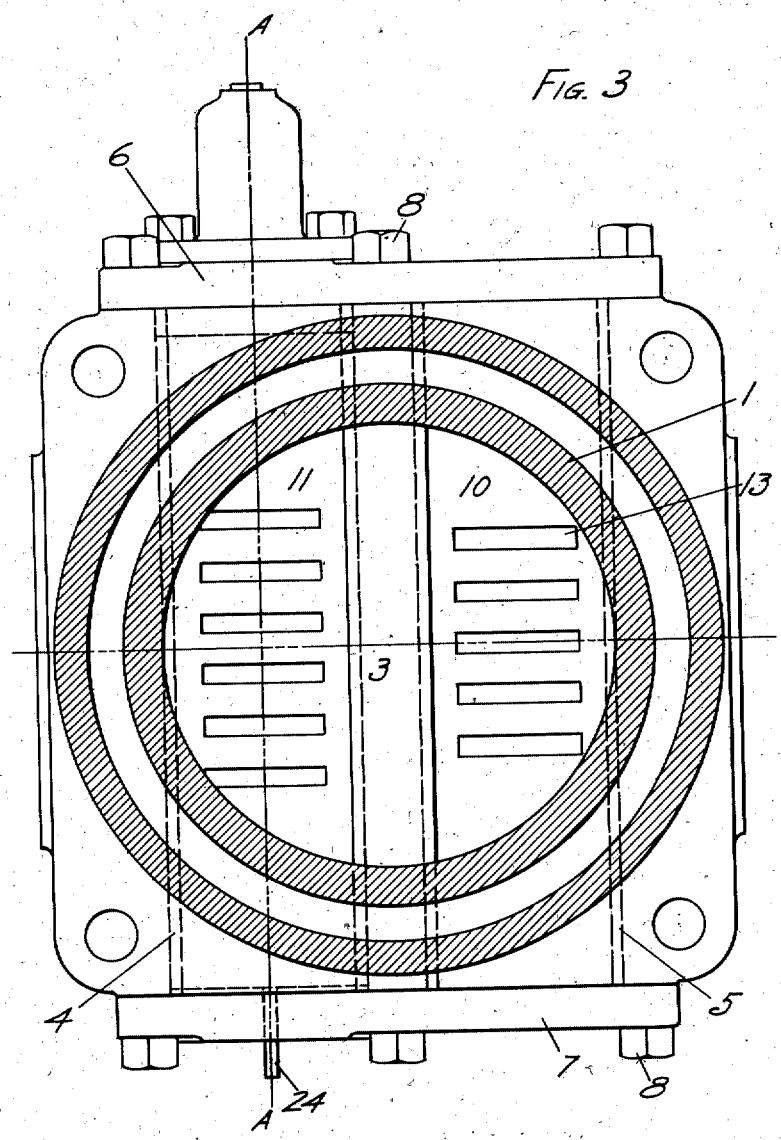

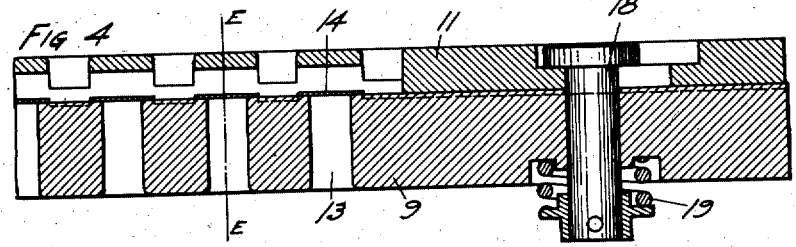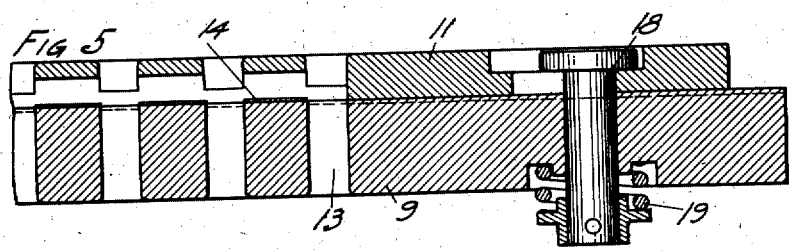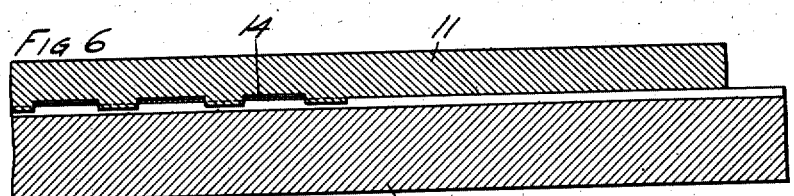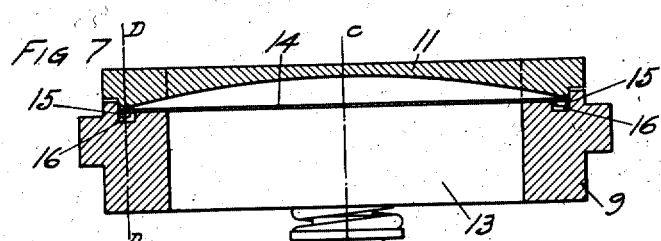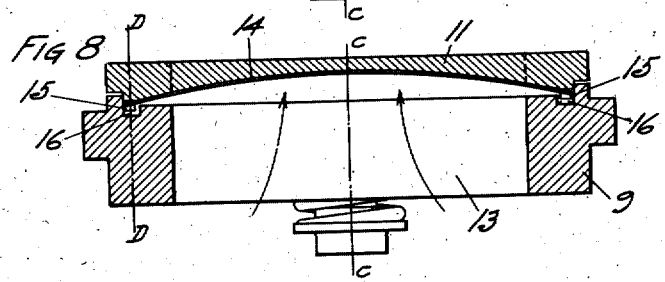

UNITED STATES PATENT OFFICE.

GEORGE K. DAVOL, OF SAN FRANCISCO, CALIFORNIA, ASSIGNOR, BY MESNE ASSIGNMENTS, TO P. H. REARDON, OF SAN FRANCISCO, CALIFORNIA.

VALVE FOR AIR-COMPRESSORS AND THE LIKE.

1,254,781.     Specification of Letters Patent.     Patented Jan. 29, 1918.

Application filed February 2, 1916. Serial No. 75,782.

*To all whom it may concern:*

Be it known that I, GEORGE K. DAVOL, a citizen of the United States, residing in the city and county of San Francisco, in the State of California, have invented certain new and useful Improvements in Valves for Air-Compressors and the like, of which the following forms a specification.

My invention relates generally to machines for pumping or compressing air and other gases, more particularly to the valves of compressors and the like, and to the means of regulating the output of compressing machines. The invention described and claimed herein is an improvement upon the general valve structure described in my copending application, Serial No. 54,309, filed October 6th, 1915.

My invention can be applied to many machines other than air compressors, but such applications being obvious I shall confine these specifications to the description of my invention as it may be embodied in an air compressor having a piston reciprocating in a cylinder.

My invention provides an improved construction of valve of the automatic type, or a valve which is operated by the flow of the fluid passing through it. The term "automatically operated" which I employ in these specifications and in the claims which follow will be understood therefore to designate a valve which is opened and closed in its normal operation by the action of the fluid passing; the movement of the air or other fluid in one direction opens the valve and permits passage of the air in one direction while a reversal or a stoppage of movement of the air causes or allows the valve to close on its seat and prevents passage of the air in the reverse direction. Thus the valve operates normally without any positive mechanical movement being transmitted to it or to use the ordinary term referred to "is automatically operated."

My invention makes further provision to permit the valve to be thrown open by suitable mechanical means and held open and inoperative as long as desired. By applying such a valve to the intake of a compressing machine the output of the machine can be easily regulated. When it is desired to reduce the amount of air delivered by the compressor the inlet valve can be held open which of course prevents the compression of air within the compressing chamber.

My invention provides a form of valve easily thrown open or rendered inoperative, remarkably light in weight and therefore quick and silent in operation, and which can be applied to a compressing cylinder without unduly increasing the volume of cylinder clearance.

In the accompanying drawings—

Fig. 2 is a section of the same parts taken on line A—A in Fig. 1 and Fig. 3 and shows a lengthwise section of the inlet valve;

Fig. 3 is a section taken through the cylinder in a place perpendicular to the axis of the cylinder or on the line B—B in Figs. 1 and 2 and shows the inside face of the cylinder head and valve parts;

Fig. 4 is a partial lengthwise section through the inlet valve on line C—C in Figs. 7 and 8 showing the valve in operating position;

Fig. 5 is a similar partial lengthwise section through the inlet valve on line C—C in Figs. 7 and 8 and shows the valve plates shifted to the inoperative position;

Fig. 6 is a partial lengthwise section through the inlet valve on the line D—D in Figs. 7 and 8 and shows particularly the manner of holding the valve plates in place;

Fig. 7 is a cross section of the inlet valve taken on line E—E in Fig. 4, showing the valve plates resting on the valve seat or in the closed position; and Fig. 8 is a similar cross section of the inlet valve on line E—E in Fig. 4, showing a valve plate raised off its seat by the current of air passing through.

Similar parts shown in the various views are designated by the same reference numbers in all the views.

Figure 1:
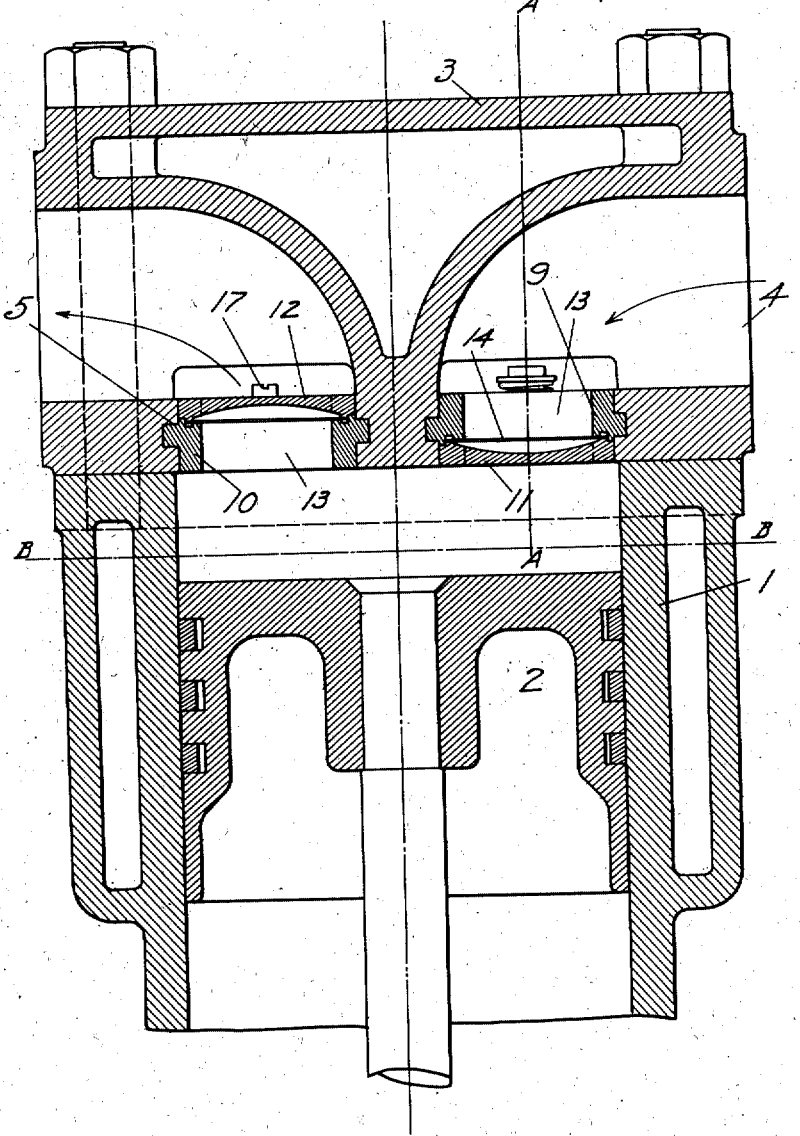
Figure 1 is a section taken on the axis of the cylinder of an air compressor fitted with the valves which form the subject of my invention.

The novel features of my invention comprise a valve seat having a series of transverse slots or ports formed in it and arranged in line, preferably parallel to each other, together with a series of separate flexible elastic valve plates, normally covering these slots or ports. The valve plates are loosely held in position so that they can bend away from the seat under the action of the fluid passing through the valve. These valve plates are held in position by a sliding frame which can be moved relative to the valve seat and by such movement the valve plates can be moved from this normal operative position covering each of the valve seat ports to the inoperative positions between the ports; which leaves the ports entirely open or uncovered.

This general idea has been carried out before by utilizing one valve plate to cover several ports and forming openings in the single plate for the passage of air, but there are great practicable advantages to be gained by providing an entirely separate valve for each slot or port in the seat. Each valve plate covering each port then operates independently and the valve plates become simple straight strips of spring metal which are easy to manufacture.

Referring to the drawings, Figs. 1, 2, and 3 show a cylinder 1 of an air compressor, in which a piston 2 reciprocates. The cylinder head 3 is secured by studs to the cylinder and has two transverse valve seat passages 4 and 5 formed in it in a plane perpendicular to the axis of the cylinder. These valve seat passages open externally on opposite sides of the cylinder head and cylinder and when the cylinder head is in place, are closed at each end by the end plates 6 and 7, Figs. 2 and 3, which end plates are secured to both cylinder head and cylinder by suitable studs 8.

The inlet valve seat 9 and the delivery valve seat 10 Figs. 1, 2, and 3 are both the same and are formed to fit or slide in the grooves formed in the sides of the passages 4 and 5. These valve seats are of the same length as the passages which hold them, and the end plates 6 and 7 bear against the ends of the valve seats the same as they bear against the cylinder head and cylinder and make air tight joints with valve seat ends, cylinder head and cylinder. A thickness of packing material is preferably interposed between these parts and the end plates.

It will be seen in Fig. 1 that the inlet valve seat 9 and the delivery valve seat 10 while both the same, are turned to face in opposite directions or in the direction of the flow of the air which is denoted by arrows in Fig. 1. Against the face of each seat, a stop plate or guard plate 11 and 12 is held, and this stop or guard plate is formed to hold the valve plates in position and to limit their opening movement. In Fig. 3 the inlet valve stop plate 11 is shown facing the interior of the cylinder, while for the delivery side, the valve seat 10 faces the interior of the cylinder.

Figs. 4, 5, 6, 7 and 8 show enlarged sections of the valve seat, stop plate and valves, and as therein indicated, the seat is provided with a series of parallel slots or ports 13 formed through it, and each port is normally covered by a separate independent valve plate 14. These valve plates 14 are thin flexible metal strips and their normal action in opening and closing is shown in Figs. 7 and 8. Fig. 7 shows the valve plate lying closed on its seat while Fig. 8 shows the valve plate bowed away from the seat at its central portion by the flow of air passing in the direction of the arrows through the port. The ends of the valve plates or strips are loosely held in jaws or recesses formed in projecting ribs 15 on the stop plate 11. These projecting ribs 15 fit into grooves 16 formed in the face of the valve seat, with suitable clearance, and these grooves serve to maintain the stop plate and seat in proper alinement.

In the delivery valve the stop plate 12 and valve seat 10 are rigidly fastened together by screws 17 indicated in Fig. 1 but in the inlet valve, sections of which are shown in Figs. 2, 4, 5 and 6, the stop plate 11 is free to slide lengthwise on the seat 8, being guided by the intermeshing grooves and ribs referred to and being held in contact with the seat by two spring actuated plungers 18. one of which is shown in Figs. 4 and 5. These plungers have enlarged heads which bear in recesses formed in the outer side of the stop plate 11 and passing through the stop plate and valve seat 9 engage with the spring 19 and so exert a constant force drawing together the stop plate and seat 9. The stem of this plunger 18 also serves as indicated in Figs. 4 and 5 to limit the length of movement permitted the stop plate 11 on the valve seat.

Fig. 6 shows a section taken on the line D—D Figs. 7 and 8 or directly through the rib 15 and groove 16 and shows clearly the jaws or recesses formed in the rib 15 for the reception of the ends of the valve plates 14. The valve plates are further held in position by the side of the grooves 16 which prevent the valve plates getting out of place in the direction of their length. A certain degree of looseness is allowed the valve plates in these retaining parts, permitting the plates to flex freely and rise off their seats at their central portions.

It will now be understood that if the stop plate 11 be shifted endwise relative to the seat 9, the valve plates 14 will all be carried with it or also be shifted on the face of the seat 9. Fig. 4 shows a partial section of these parts in the operative position, with the valve plates 14 lying directly over and covering the ports 13. In Fig. 5 the stop plate 11 with the valve plates 14 is shown shifted to the inoperative position, and the valve plates are shifted to positions between the ports 13 leaving the ports unobstructed either direction.

This shifting movement of the stop plate and valves must preferably be done at some and freely open to the passage of air in period other than the period of compression within the cylinder of an air compressor, as during the period of compression the valves are forced against the seat and their frictional resistance to movement under such pressure would ordinarily prevent any movement along the face of the valve seat. During the suction period however the valves are ordinarily lifted off the seat by the flow of air, and during this period offer no resistance to the shifting movement.

It will be seen that although the valve plates are held sufficiently loosely to allow of their flexing and freely raising and falling on their seats they are retained by the recesses and projections formed in the rib 15 sufficiently closely to be always properly spaced and to prevent their rising on edge or becoming displaced.

The stop and guard plate 11 can be shifted relative to the valve seat 9 by any suitable means, and with such means my invention is not importantly concerned. This shifting movement would be, in an air compressor, usually controlled by the pressure of air within the receiver, the stop plate being shifted to the inoperative position when the receiver pressure exceeded a set maximum; or this shifting can be controlled by hand or otherwise. In Fig. 2 which shows a lengthwise section through the inlet valve, the valve plates 14 and stop plate 11 are shown in operative position, the valve plates covering the ports 13. As there shown, a pin 20 extends through the end plate 6 and bears against the end of the stop plate 11. Outside of the end plate 6 a spring bonnet 21 is secured, containing a spring 22, and a spring plunger 23, which bears against the pin 20 and so through the pin forces and holds ordinarily the stop or guard plate 11 against a suitable stop and in its operative position. A similar pin 24 extends through the end plate 7 and bears against the opposite end of the stop plate 11 and this pin 24 is supposed to be connected with and operated by any suitable controlling apparatus, either automatic in operation or manually operated. When a suitable pressure is exerted against the pin 24 the stop plate and valves can be shifted against the action of the spring 22 into the inoperative or open position and when such pressure is released the spring 22 will return the stop plate and valves to the closed or operative position.

The valve plates are all made of a suitable spring material, spring steel being very suitable for this purpose and in their closing movements they operate as their own springs, or in other words no closing springs are required other than the elasticity of the valve plate itself.

In the accompanying claims I have referred to a valve seat having transverse ports formed in it and by the expression "transverse ports" I mean to indicate ports, the length of which lies transversely to the long axis or length of the valve seat.

What I claim is:

1. In an air compressor the combination of a valve seat having a series of slots or ports, a plurality of separate flexible automatically operated valve plates bearing on the said seat and means for moving the said valve plates across or along the face of the said seat, to cover or uncover the said ports.

2. In a compressor the combination of a valve seat having a plurality of parallel slots or ports, a plurality of separate flexible automatically operated valve plates, the said valve plates being loosely held individually in parallel positions against the face of the said valve seat and means for shifting the said valve plates along or across the said valve seat to cover or uncover the said ports.

3. In a compressor the combination of a valve seat having a series of parallel ports or openings, a plurality of separate flexible elastic automatically operated valve plates of rectangular form, loosely held in parallel positions against the face of the said valve seat, and means for shifting or moving the said valve plates simultaneously along or across the said valve seat to cover or uncover the said ports.

4. In a compressor the combination of a valve seat having a series of ports or openings arranged in line, a plurality of separate flexible automatically operated valve plates also arranged in line and loosely held in parallel positions in contact with the face of the said valve seat, and means for shifting the said valve plates along or across the face of the said valve seat.

5. In a compressor the combination of a valve seat having a series of separate ports or openings, a plurality of separate flexible valve plates, a stop plate or guard plate disposed in front of the said valve seat, the said stop plate loosely holding the said valve plates individually in contact with the said seat but allowing the said valve plates to bend away from the said seat, and means for shifting the said stop plate together with the said valve plates across the said valve seat to cover or uncover the said ports.

6. In a compressor the combination of a valve seat having a series of separate ports or openings, a plurality of separate flexible valve plates having a length greater than their width, a stop plate or guard plate, the said stop or guard plate having jaws or fingers which engage the ends of the said flexible valve plates and hold them individually in contact with the face of the said valve seat, and means for shifting the said stop or guard plate together with the said valve plates, along or across the face of the said valve seat to cover or uncover the said ports.

7. In a compressor, the combination of a valve seat having a series of separate ports or openings, a plurality of separate flexible valve plates having a length greater than their width, a movable stop plate or guard plate held in front of or against the said valve seat, the said flexible valve plates being loosely held at each end by suitable engagement with the said stop or guard plate, and means for shifting or moving the said stop or guard plate together with the said flexible valve plates across or along the face of the said seat to cover or uncover the said ports.

8. In a compressor, the combination of a valve seat having a plurality of slots or ports, a plurality of separate flexible valve plates held in front of or bearing on the said seat, a movable stop or guard plate disposed in a position to limit the flexure of the said flexible valve plates, the said stop or guard plate having loose engagement with the said valve plates at each of their ends; and means for shifting the said stop plate together with the said valve plates relative to the said valve seat to cover or uncover the said ports.

9. In a compressor the combination of a valve seat having a plurality of slots or ports, a stop or guard plate held in front of or against the said seat and movable along or across the said seat, a series of separate flexible flat valve plates held between the said seat and the said movable guard plate, the said valve plates being held by loose engagement at their ends with the said stop or guard plate while their center portions have a less confined degree of movement, permitting a flexure or bowing away from the said seat at their center portions and means for shifting or moving the said guard plate together with the said valve plates across or along the said valve seat.

10. In a compressor the combination of a valve seat having a plurality of ports arranged in line, a plurality of flexible flat rectangular valve plates, a stop or guard plate disposed in front of the said valve seat, the said stop or guard plate having a series of jaws or slots which receive the ends of the said valve plates, and means for shifting or moving the said stop or guard plate across or along the face of the said valve seat.

11. In a compressor the combination of a valve seat having a series of ports or openings, a stop or guard plate held against the said valve seat but free to move along or across the said seat, a plurality of separate independently flexible valve plates or strips normally covering the said ports in the said seat, the said flexible valve plates having engagement at their ends with the said stop or guard plate but being free to flex or bend off the said seat under action of air passing in one direction through the said ports, and means for moving the said stop or guard plate together with the said valve plates along the face of the said seat to uncover the said ports.

12. In a compressor the combination of a valve seat having a series of transverse slots or ports arranged in line, a sliding plate held against one side of the said valve seat, the said sliding plate also having a series of transverse slots or ports arranged in line, a plurality of separate flexible valve plates disposed between the said valve seat and the said sliding plate and having engagement with the said sliding plate, and means for moving the said sliding plate with relation to the said valve seat.

13. In a compressor the combination of a valve seat having a series of ports or openings, a sliding plate disposed in front of the said valve seat, a plurality of separate valve plates disposed between the said valve seat and the said sliding plate and having engagement with the said sliding plate, a spring or springs tending to hold the said valve seat and the said sliding plate together, and means for shifting or moving the said sliding plate with relation to the said valve seat.

14. In a compressor the combination of a valve seat of length greater than its width having a series of transverse ports or openings therein, a sliding stop or guard plate in sliding engagement with the face of the said valve seat, a plurality of separate flexible valve plates disposed between the said seat and the said sliding plate and having engagement with the said sliding plate, and means for moving the said sliding plate together with the said valve plates along the face of the said valve seat.

15. In a compressor the combination of a valve passage in a plane substantially perpendicular to the axis of the compressing cylinder, a valve seat held within the said valve passage, a sliding stop or guard plate also held within the said valve passage and in contact with the face of the said seat, a plurality of separate flexible valve plates held between the said seat and the said sliding plate and having engagement with the said sliding plate, and means for moving or shifting the said sliding plate together with the said valve plates along the said valve seat.

16. In a compressor the combination of a valve seat of length greater than its width having a plurality of transverse ports formed therein, a plurality of separate flexible elastic valve plates and a guard or stop plate, the said valve plates engaging individually with the said guard or stop plate and being movable together with the said guard or stop plate along the face of the said valve seat.

17. In a compressor the combination of a valve seat of length greater than its width having a plurality of transverse ports formed therein, a plurality of separate flexible elastic valve plates, held parallel to the said ports, a groove on each side of the said valve seat faces running lengthwise of the valve seat, a movable guard or stop plate, held against the face of the said valve seat, a rib formed on each side of the said guard or stop plate, the said ribs entering the said grooves formed on the face of the said valve seat, the said ribs being cut out or recessed to embrace and hold the ends of the said valve plates and means for shifting or moving the said guard or stop plate together with the said valve plates relative to the said valve seat.

18. In an air compressor, the combination of a valve seat having a series of slots or ports, a plurality of individual flexible automatically operated valve plates bearing on the said seat, and means for moving all of said valve plates along the face of the said seat simultaneously to cover or uncover said ports.

19. In a compressor, the combination of a valve seat having a series of ports or openings arranged in line, a plurality of separate flexible automatically operated valve plates also arranged in line and loosely held individually in contact with the face of the said valve seat, and means for shifting the said valve plates simultaneously along or across the face of said valve seat.

20. In combination, a flat valve seat having a port therethrough, a guard plate overlying said port, a flexible metal valve held loosely by said guard plate upon said seat to cover said port, and means for moving said guard plate and valve plate laterally along the valve seat.

21. In combination, a valve seat having a series of slots or ports therethrough, valve mechanism for said seat, said mechanism comprising a plurality of independent valve plates of thin spring metal, said plates being individual to the ports, and a common guard plate having means for holding said plates loosely over said ports, and means for moving said guard plate and said valve plates to uncover or to cover said ports.

In witness whereof, I hereunto subscribe my name this 26th day of January, 1916.

GEORGE K. DAVOL.

Witnesses:
W. W. HEALEY,
M. E. EWING.

It is hereby certified that in Letters Patent No. 1,254,781, granted January 29, 1918, upon the application of George K. Davol, of San Francisco, California, for an improvement in "Valves for Air-Compressors and the Like," errors appear in the printed specification requiring correction as follows: Page 2, after line 126 insert the words *and freely open to the passage of air in;* same page, strike out line 130; and that the said Letters Patent should be read with these corrections therein that the same may conform to the record of the case in the Patent Office.

Signed and sealed this 26th day of February, A. D., 1918.

[SEAL.]

F. W. H. CLAY,
*Acting Commissioner of Patents.*

Cl. 230—34.